US011383608B2

(12) United States Patent
Rauma

(10) Patent No.: US 11,383,608 B2
(45) Date of Patent: Jul. 12, 2022

(54) RETROFIT ELECTRIC VEHICLE CHARGING SYSTEM WITH OPTIONAL ADVERTISING AND NETWORKING FUNCTIONALITY AND RETROFITTING METHODS FOR THE SAME

(71) Applicant: Allpole, LLC, Copley, OH (US)

(72) Inventor: Harri T. Rauma, Langley (CA)

(73) Assignee: Allpole, LLC, Copley, OH (US)

( * ) Notice: Subject to any disclaimer, the term of this patent is extended or adjusted under 35 U.S.C. 154(b) by 48 days.

(21) Appl. No.: 16/709,958

(22) Filed: Dec. 11, 2019

(65) Prior Publication Data

US 2020/0189412 A1 Jun. 18, 2020

Related U.S. Application Data

(60) Provisional application No. 62/779,259, filed on Dec. 13, 2018.

(51) Int. Cl.
| | | |
|---|---|---|
| *B60L 53/31* | (2019.01) | |
| *B60L 53/30* | (2019.01) | |
| *B60L 53/66* | (2019.01) | |
| *F21S 8/08* | (2006.01) | |
| *F21W 111/02* | (2006.01) | |

(52) U.S. Cl.
CPC ............ *B60L 53/31* (2019.02); *B60L 53/305* (2019.02); *B60L 53/665* (2019.02); *F21S 8/085* (2013.01); *B60L 2250/16* (2013.01); *F21W 2111/02* (2013.01)

(58) Field of Classification Search
CPC ................................ B60L 53/31; B60L 53/305

USPC ............................................................ 320/109
See application file for complete search history.

(56) References Cited

U.S. PATENT DOCUMENTS

| | | | | |
|---|---|---|---|---|
| 2012/0013300 A1* | 1/2012 | Prosser | ............... | B60L 11/1844 320/109 |
| 2012/0032635 A1* | 2/2012 | Prosser | ................... | B60L 53/14 320/109 |
| 2012/0229085 A1* | 9/2012 | Lau | ......................... | B60L 50/66 320/109 |
| 2013/0080254 A1* | 3/2013 | Thramann | ............... | B60L 53/68 705/14.57 |
| 2013/0268433 A1* | 10/2013 | Viner | ..................... | B60L 53/00 705/40 |
| 2013/0338820 A1* | 12/2013 | Corbett | ................... | B60L 53/14 320/109 |

(Continued)

FOREIGN PATENT DOCUMENTS

| | | |
|---|---|---|
| CN | 204611691 U | 9/2015 |
| WO | 2013034872 A2 | 3/2013 |

*Primary Examiner* — Suchin Parihar
(74) *Attorney, Agent, or Firm* — Edwin A. Sisson, Attorney at Law, LLC; Jeffrey J. Banyas

(57) ABSTRACT

Systems and methods for retrofitting existing light and other poles to provide additional functionality in the form of one or more electric vehicle charging stations. Exemplary systems include EV charging station bases that are interposable between an existing pole and its associated buried anchor base, and include one or more EV charging stations that may be powered through the existing electrical wiring of the pole to be retrofit. Exemplary systems may offer additional functionality in the form of optional advertising, Internet connectivity, and other features.

20 Claims, 8 Drawing Sheets

(56) References Cited

U.S. PATENT DOCUMENTS

| | | | |
|---|---|---|---|
| 2015/0294431 A1* | 10/2015 | Fiorucci | G07B 15/02 |
| | | | 705/13 |
| 2016/0240114 A1 | 4/2016 | Rauma et al. | |
| 2017/0210238 A1* | 7/2017 | Buehs | H02J 7/0045 |
| 2020/0031248 A1* | 1/2020 | Kwak | H02J 7/0042 |
| 2020/0039367 A1* | 2/2020 | Lyden | B60L 53/31 |
| 2020/0044453 A1* | 2/2020 | Lyden | H02J 3/383 |
| 2020/0055416 A1* | 2/2020 | Johansen | B60L 53/68 |
| 2020/0084831 A1* | 3/2020 | Urban | G08G 1/094 |
| 2020/0355335 A1* | 11/2020 | Weber | F21V 23/0464 |

* cited by examiner

RETROFIT ELECTRIC VEHICLE CHARGING SYSTEM WITH OPTIONAL ADVERTISING AND NETWORKING FUNCTIONALITY AND RETROFITTING METHODS FOR THE SAME

CROSS REFERENCES AND PRIORITIES

This Application claims priority from U.S. Provisional Application No. 62/779,259 filed on 13 Dec. 2018, the teachings of which are incorporated by reference herein in their entirety.

BACKGROUND

As would no doubt be familiar to most, the last decade has seen a proliferation of electric vehicle (EV) manufacturing, sales and use. The reasons are likely many, including but not limited to legislation, gasoline prices, increasing evidence of the negative effect of fossil fuel emissions on climate change, and advances in battery and other relevant technologies.

As EV usage continues to increase, there will be a corresponding need to increase the number of locations at which EV power supplies can be recharged. While EVs may be somewhat easily recharged at a residential location—either through a standard 120V household outlet (i.e., Level 1 charging) or a specially installed 240V (Level 2) charging station—the limited range offered by most EV power supplies also mandates the existence of non-residential Level 2 and Level 3 (DC) charging stations if EVs are to serve as anything more than short-range, local transportation.

According to the U.S. Department of Energy website, there are currently less than 20,000 publicly available EV charging stations in the United States. In comparison, even though their numbers have been declining for about the past two decades, there are still well in excess of 100,000 gasoline stations in the U.S. While the far greater number of gasoline powered vehicles on the roads means that the ratio of charging stations to EVs is likely greater than the ratio of gasoline stations to gasoline-powered cars, the lesser number of charging stations still means that EV drivers have far fewer choices in any given area and must frequently plan long trips based on the location of charging stations rather than on a desired route.

There are a number of hindrances to increasing the number of EV charging stations. Logistics is, of course, important, as it is desirable to locate EV charging stations in areas that are convenient to many users and where it is not problematic for multiple vehicles to be parked during the charging process. Another hindrance is cost. EV charging stations are expensive to purchase and install. The cost is significant even when a charging station and its infrastructure can be installed at the time of new construction (e.g., in a parking deck or in a commercial or residential parking lot). The cost, and the difficulty, of installation is further exacerbated when it is desired to install an EV charging station without corresponding new construction (e.g., in an existing parking deck or in an existing commercial or residential parking lot).

There has been some development in the area of retrofit EV charging stations. However, to the knowledge of the inventors, existing retrofit charging stations are essentially bolt-on units that are attached to existing light or other poles. Such a design is problematic for several reasons. First, government regulations normally mandate that poles must be designed relative to the geographic location of installation and for the climatic conditions that exist therein. Of particular but not sole concern in this regard is the vibratory effects that will be imparted to a given pole by the wind and other conditions present at its location. Changing and even constant wind conditions can produce dynamic vibration in a pole, and such vibrations can be detrimental to the pole and its ability to support any load attached thereto. The addition of any object—such as an EV charging station—to a pole will alter the frequency response of the pole and the way it reacts to wind and other loads. Consequently, simply bolting an EV charging station to an existing pole is inadvisable.

Installed poles, such as light poles, utility poles, etc., also generally include a surrounding safety zone. The safety zone is designed to ensure, or at least minimize, the likelihood that a pedestrian or vehicle will impact the pole when passing by. The size of the safety zone may vary, but traditionally has been at least equal to the largest diameter (or projected diameter) of the buried anchor base to which the pole is attached. In any case, attaching any device to the side of an existing pole reduces the safety zone and may violate the ordinances or other relevant rules applicable to the location of installation. This may be especially true given the recent trend of expanding the safety zones associated with poles to provide a greater buffer between the poles and pedestrian and vehicular traffic.

From the foregoing remarks, it should be understood that there is clearly a need for improved systems and methods by which EV charging stations may be more easily and cost effectively retrofitted to existing poles, and without the other deficiencies inherent to known systems and techniques. The exemplary retrofit EV charging systems and methods of installation described herein satisfy this need, and may optionally offer additional novel and valuable features.

SUMMARY

A retrofit electric vehicle (EV) charging system is disclosed. The retrofit electric vehicle (EV) charging system may comprise an existing pole to be retrofit, a custom EV charging station base, and at least one EV charging station which may be built into the EV charging station base. The custom EV charging station base may comprise a secure, substantially hollow enclosure interposed between the pole to be retrofit and an existing buried anchor base to which the pole is initially secured. The at least one EV charging station may be configured for protected connection within the EV charging station base to a source of electrical energy. The at least one EV charging station may permit the charging of an electric vehicle from the exterior of the EV charging station base.

In some embodiments, the EV charging station base may have a cross-sectional shape selected from the group consisting of frusto-pyramidal, circular, and substantially circular.

In some embodiments, the EV charging system may comprise an internet connection mechanism. When present, the internet connection mechanism may be selected from the group consisting of Wi-Fi, ethernet, cellular communications, and combinations thereof. In some embodiments comprising an internet connection mechanism, the retrofit electric vehicle charging system may further comprise a point-of-sale (POS) payment processor. The point-of-sale (POS) payment processor—when present—may be selected from the group consisting of a mobile payment processor utilizing a smart phone or similar device, a credit card processor, a check processor, a charging system-specific user account processor, and combinations thereof. In some embodiments comprising an internet connection, the EV charging station base may comprise at least one display selected from the group consisting of a static display, a dynamic display, an audible display, and combinations thereof. In some embodiments comprising an internet connection, the EV charging station base may comprise at least one display selected from the group consisting of a static display, a dynamic display, an audible display, and combinations thereof.

In some embodiments, the retrofit electric vehicle charging system may further comprise a point-of sale (POS) payment processor. When present, the point-of-sale (POS) payment processor may be selected from the group consisting of a mobile payment processor utilizing a smart phone or similar device, a credit card processor, a check processor, a charging system-specific user account processor, and combinations thereof.

In some embodiments, the existing pole may comprise a moving display element. The moving display element, when present, may be a three-dimensional sign. When the moving display element is a three-dimensional sign, the three-dimensional sign may be configured to rotate about a central axis of the existing pole. In some embodiments where the display element is a three-dimensional sign, the EV charging station base may further comprise electrical hardware to provide electrical energy to the moving display element.

In some embodiments, the EV charging station base may comprise at least one display selected from the group consisting of a static display, a dynamic display, an audible display, and combinations thereof.

In some embodiments, the EV charging station base may comprise at least four EV charging stations.

A method of retrofitting an existing pole to add at least one electric vehicle (EV) charging station is also disclosed. The method may comprise the steps of: providing a custom EV charging station base comprising a secure, substantially hollow enclosure, the EV charging station base further comprising at least one EV charging station; disconnecting the pole to be retrofit from an existing buried anchor base residing subjacent to the pole; securing a lower end of the EV charging station base to the buried anchor base; affixing a base of the pole to a top end of the EV charging station base such that the EV charging station base is securely interposed between the pole and the anchor base; and connecting the at least one EV charging station to a source of electrical energy at a point within the EV charging station base. The electric vehicle may be charged according to the method by the at least one EV charging station from outside the EV charging station base.

BRIEF DESCRIPTION OF FIGURES

In the following descriptions of the drawings and exemplary embodiments, like reference numerals across the several views refer to identical or equivalent features, and.

DETAILED DESCRIPTION

Figure 1:
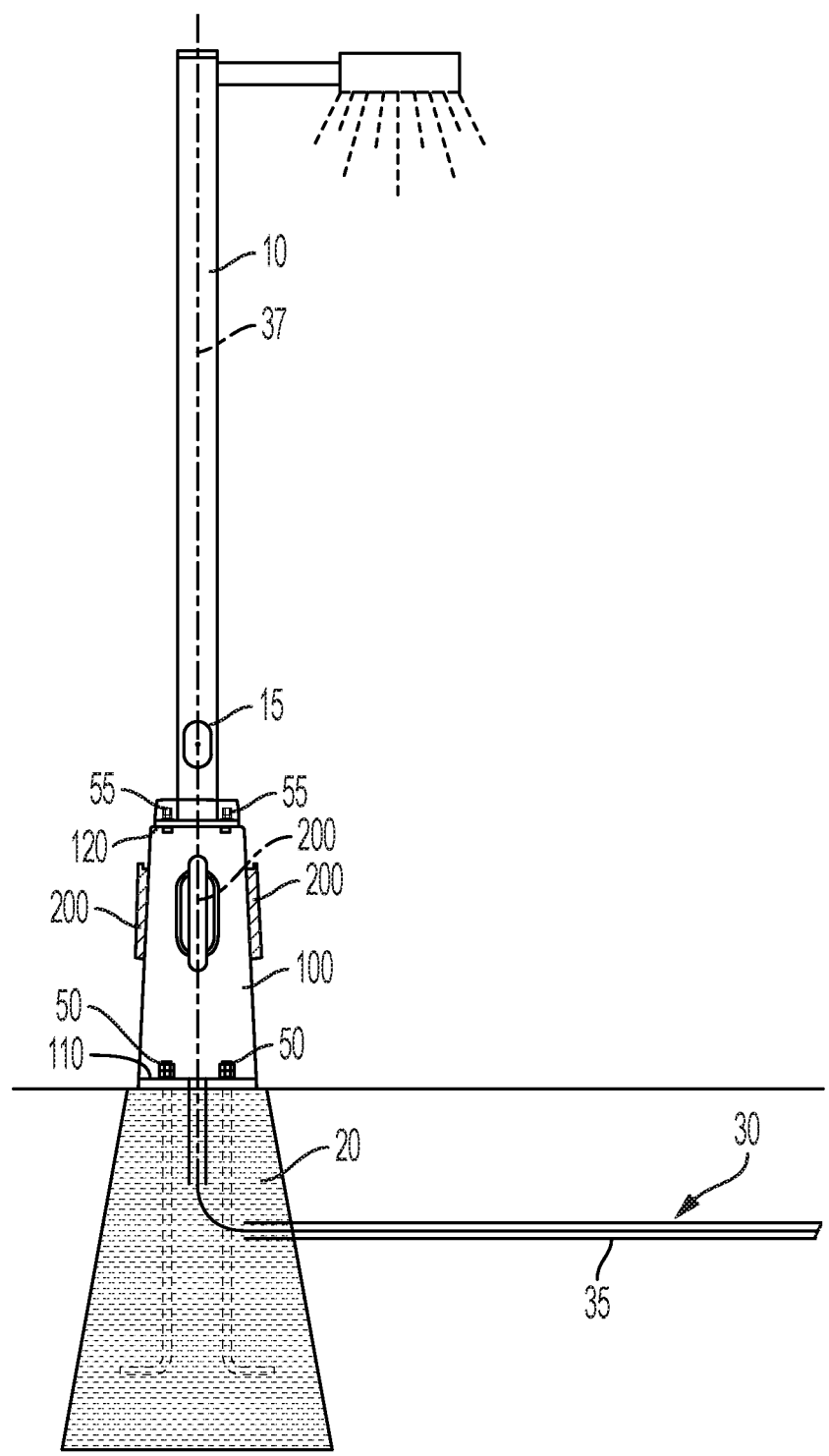
FIG. 1 depicts an exemplary embodiment of a retrofit EV charging system installed to an existing light pole.

One exemplary embodiment of a retrofit EV charging system according to the general inventive concept is schematically represented in FIG. 1. As shown, the system comprises an exemplary retrofit EV charging station base (100) that has been interposed between an already existing light pole (10) and a buried anchor base (20), such as a typical concrete anchor base, to which the light pole is normally connected.

The EV charging station base in the exemplary embodiment of FIG. 1 is shown to be frusto-pyrimidal (i.e., of tapering rectangular shape), but other EV charging station base shapes are also possible as described in more detail below. The larger proximal end (110) of the EV charging station base is configured for secure attachment to the existing concrete anchor base and, therefore, may include through holes in a pattern that corresponds to a number of bolts or other fastener elements (50) associated with the concrete anchor base. Similarly, the distal end (120) of the EV charging station base is configured for secure attachment to the base of the existing light pole—typically, by passing threaded fasteners (55) through holes in a base plate of the light pole and provided holes in the proximal end of the EV charging station base.

The EV charging station base (100) in this exemplary embodiment includes four separate EV charging stations (200), but other numbers of EV charging stations may be present on other EV charging station bases. As described in more detail below, an exemplary EV charging station base according to the general inventive concept may house all of the electrical and electronic hardware necessary to operate the provided EV charging station(s), as well as a light and/or any other electrically-powered elements associated with the pole being retrofit.

The electrical energy required to operate the pole light and the EV charging stations of the exemplary system of FIG. 1 is obtained from the existing electrical feed (30) for the pole being retrofit. In a typical light pole installation—as represented in FIG. 1—underground conduit (35) carries electrical wiring (37) from a source of electrical energy to and through the concrete anchor base, and into a hollow interior of the pole. During the retrofitting process, this electrical wiring is rerouted to also power the EV charging station and any additional electrical energy-consuming devices associated with the installation. In the event that the wiring is incapable of powering the EV charging stations (e.g., is of insufficient gauge) and/or the voltage of the electrical energy supply is incorrect (e.g., 120V versus 240V), new wiring can typically be easily routed from the source to the EV charging station base via the existing conduit.

To retrofit the pole of FIG. 1, the pole wiring is first disconnected or cut, and the pole is detached from the concrete anchor base. The proximal end of the EV charging station base is then securely attached to the concrete anchor base at the location previously occupied by the pole, with the electrical wiring from the source passing into the EV charging station base and being properly connected to the electrical hardware located therein. The pole wiring is then connected within the EV charging station base so as to provide electrical energy to the pole light, and the base of the pole is securely attached to the distal end of the EV charging station base. In some cases, a given pole may have an access opening (15) that permits the pole wiring to be accessed from outside the pole, and in such cases it may be possible to secure the pole to the EV charging station base before connecting the pole light wiring. In any case, after the pole light wiring is connected, the pole light will operate as before, but with the added benefit of the EV charging stations.

Figure 2:
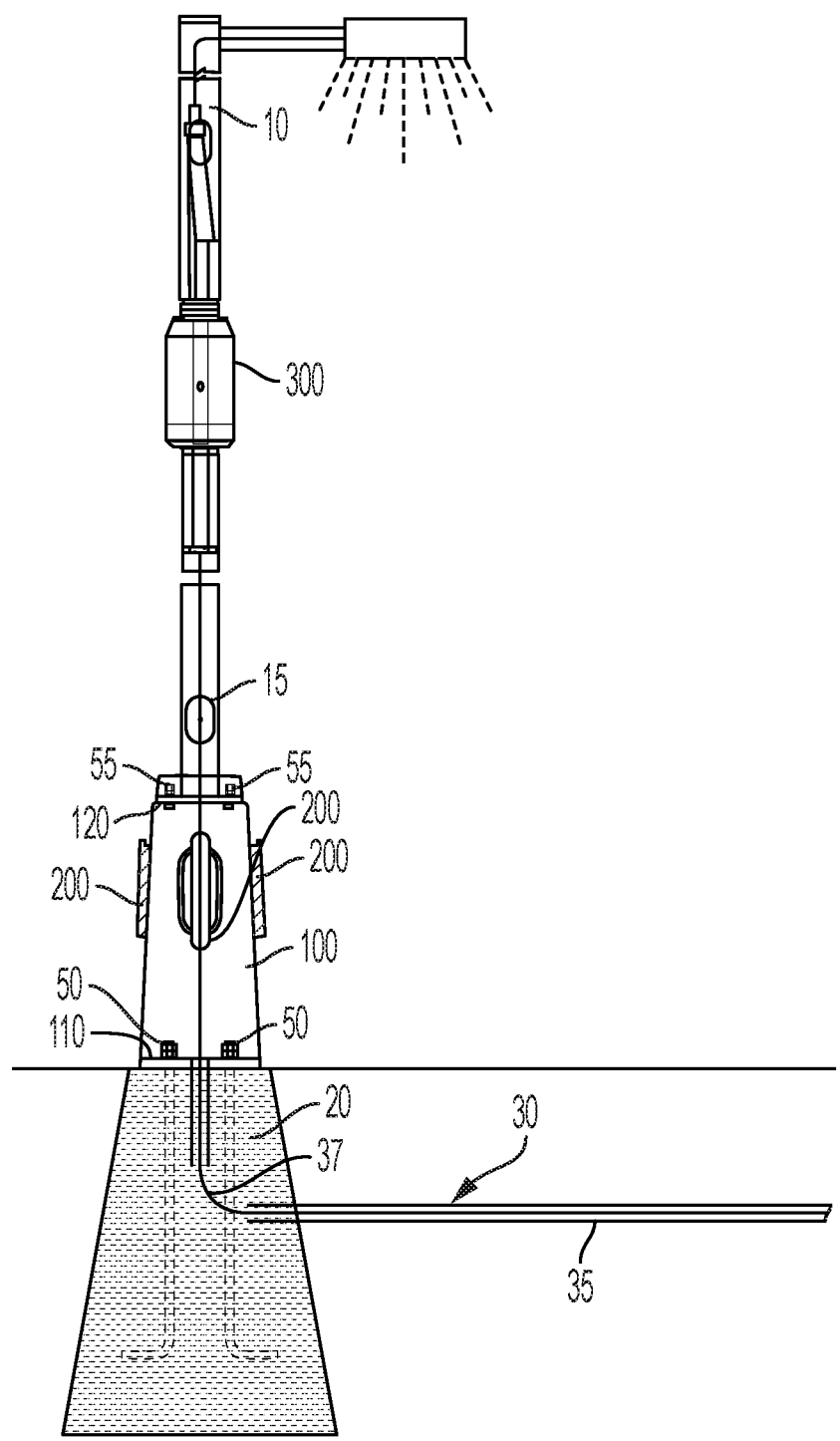
FIG. 2 depicts an alternative exemplary embodiment of a retrofit EV charging system installed to an existing light pole along with a moving advertising feature.

An alternative exemplary embodiment of a retrofit EV charging system according to the general inventive concept is schematically represented in FIG. 2. In this exemplary system embodiment, an exemplary retrofit EV charging station base (100) is again interposed between an already existing light pole (10) and a buried concrete anchor base (20) to which the light pole is normally connected, in the same or a similar manner to that described above.

Unlike the exemplary system of FIG. 1, in the exemplary system of FIG. 2, the existing light pole has also been modified. Particularly, the light pole has been separated (e.g., cut) into two sections and further modified to accommodate a moving display element (300). In this particular example, the moving display element is a three-dimensional sign that rotates about the central axis of the pole. In such a system, the retrofit EV charging station base may include further electrical hardware to provide electrical energy to and/or otherwise support the operation of the moving display element. Additional details relative to the design, construction and operation of the moving display element are described below and shown in FIG. 6.

Figure 3:
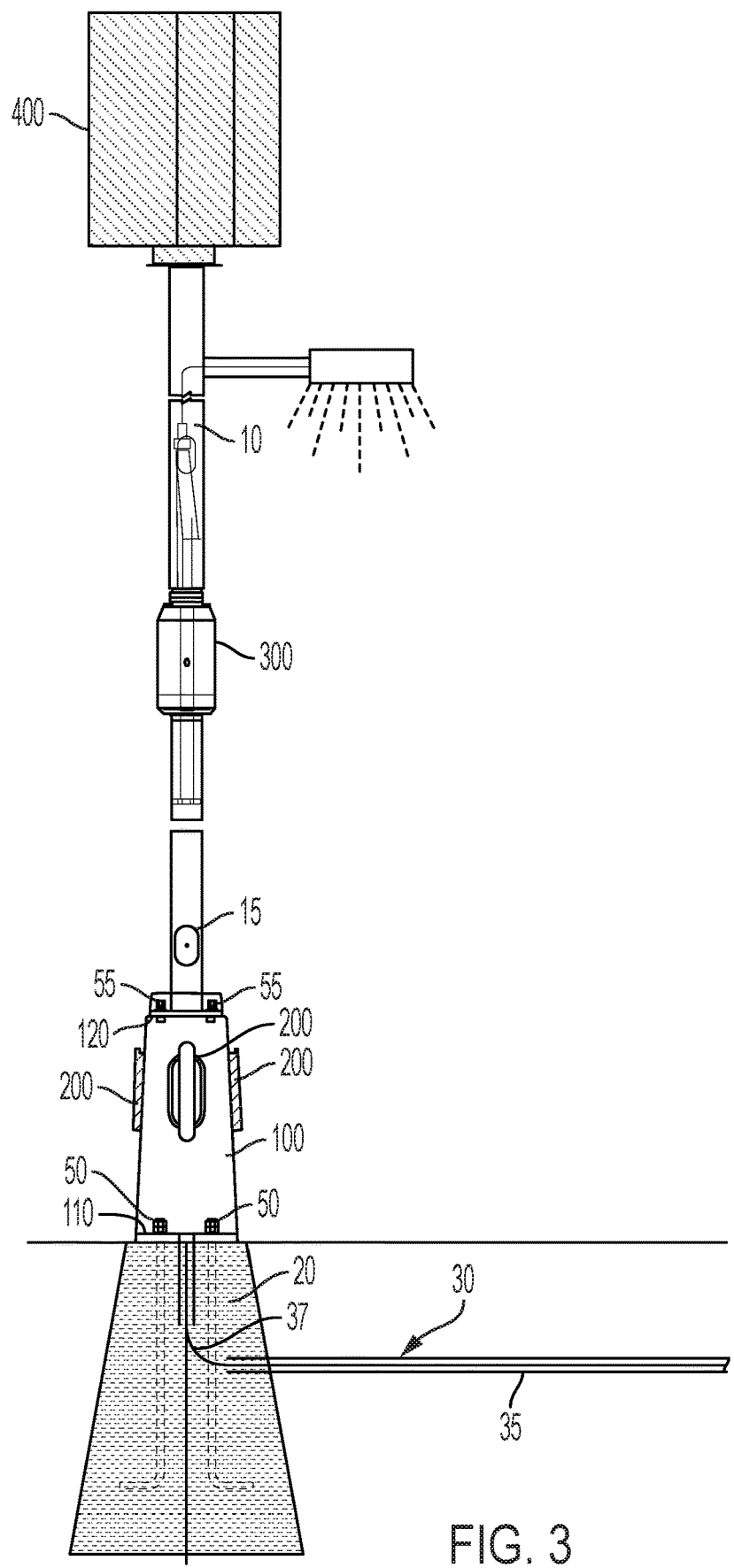
FIG. 3 shows the retrofit EV charging system of FIG. 2, further including a specialized vertical wind turbine that contributes to at least certain portions of the system energy demand.

Another alternative exemplary embodiment of a retrofit EV charging system according to the general inventive concept is schematically represented in FIG. 3. Like the exemplary system embodiments represented in FIG. 1 and FIG. 2, an exemplary retrofit EV charging station base (100) has again been interposed between an already existing light pole (10) and a buried concrete anchor base (20) to which the light pole is normally connected. The mechanical and electrical connections may occur in the same or a similar manner to that described above regarding the exemplary embodiments of FIG. 1 and FIG. 2.

The exemplary system of FIG. 3 is substantially the same as the exemplary system of FIG. 2, except that the exemplary system of FIG. 3 further includes an alternative electrical energy generation means. As shown for purposes of illustration in FIG. 3, the alternative electrical energy generation means is a vertical wind turbine (400) that is located along the top of the light pole and connected to the circuitry of the system (see FIG. 7) to supplement the primary source of system electrical energy. While a vertical wind turbine is utilized in the particular exemplary embodiment of FIG. 3, it is to be understood that other supplementary electrical energy generation devices such as but not limited to one or more solar panels may be substituted for or used in conjunction with a wind turbine in other system embodiments. Furthermore, when a wind turbine is used, the wind turbine is not required to be of vertical design. It is also contemplated that the exterior of the pole and/or the EV charging station base of an exemplary system may be coated with a substance known to produce electrical energy when subjected to sunlight.

Figure 4A:
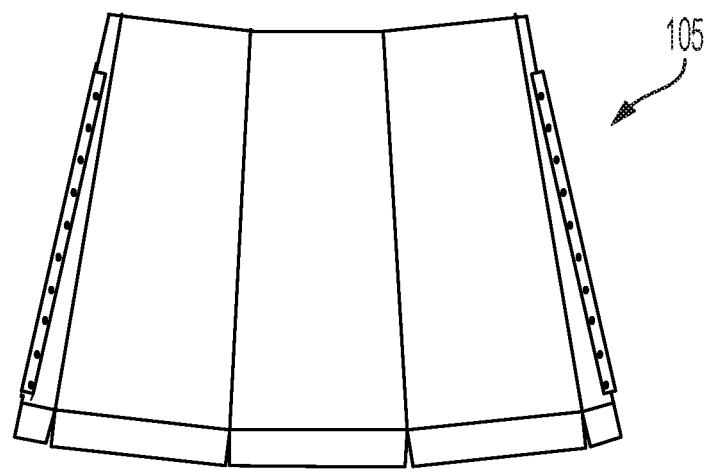
FIG. 4A is an unassembled view of an exemplary custom transformer base blank of tapered rectangular shape that, when assembled, may form a part of certain exemplary systems.
Figure 4B:
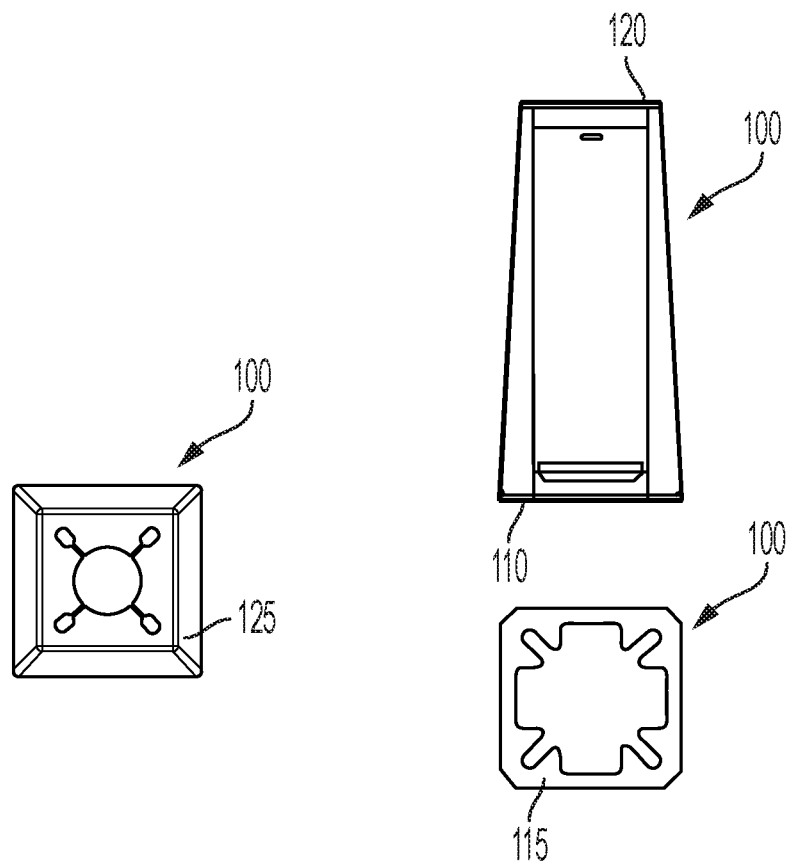
FIG. 4B shows several views of the exemplary custom transformer base of FIG. 4A in a fully bent and assembled condition.

FIGS. 4A-4B schematically depict several views of an exemplary frusto-pyramidal EV charging station base (100), such as or similar to the EV charging station base depicted in FIGS. 1-3. FIG. 4A illustrates that such an exemplary EV charging station base embodiment may be formed from a cut blank of metal stock (105). As represented in FIG. 4B, the blank may be subsequently bent, and then joined along a seam such as by welding, to form an EV charging station base shell to which a proximal (bottom) (115) and distal (top) (125) plate may be thereafter affixed. The use of other manufacturing techniques that would be familiar to one of skill in the art are, of course, also possible.

In this exemplary embodiment, the EV charging base is comprised of 3/16 inch plate steel to provide adequate pole support and a substantially vandal-proof EV charging station housing. However, it should be understood that other materials and material thicknesses may be utilized in other embodiments, based at least in part on the nature of the pole to be supported and the environment within which the EV charging station base will be located. The material used for a given EV charging station base may also be treated and/or coated to resist corrosion, etc.

Figure 5A:
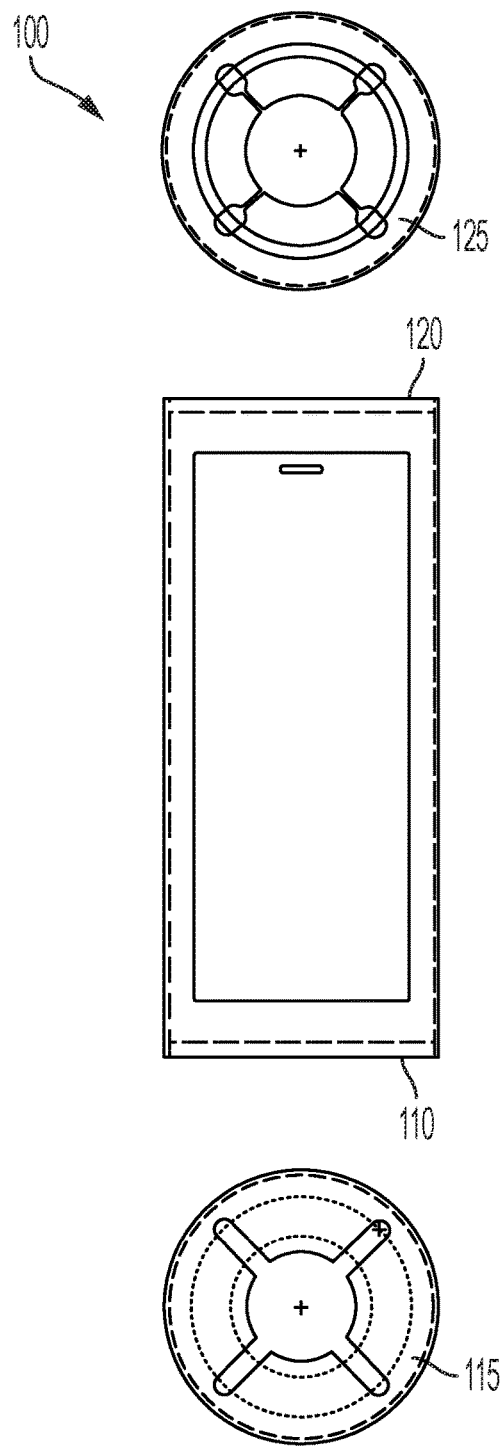
FIG. 5A shows several views of an exemplary custom transformer base of substantially circular cross-section that may form a part of certain exemplary systems.
Figure 5B:
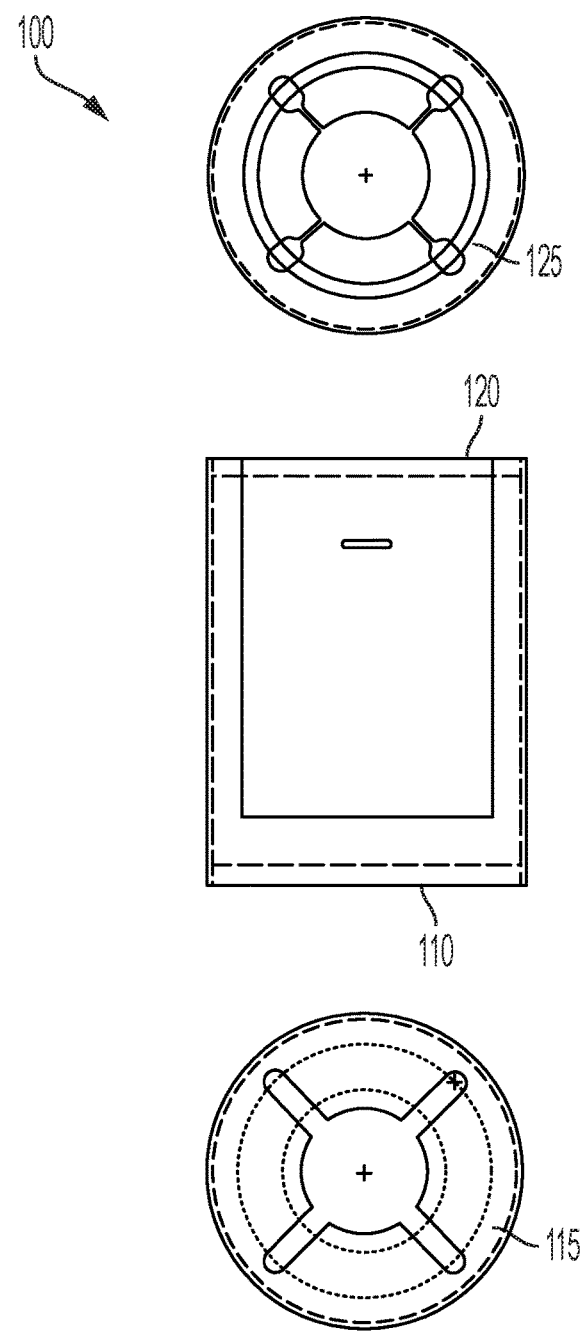
FIG. 5B shows several views of another exemplary custom transformer base of substantially circular cross-section that may form a part of certain exemplary systems.

Alternative EV charging station bases are represented in FIGS. 5A-5B. In contrast to the frusto-pyramidal shape of the exemplary EV charging station bases depicted in FIGS. 1-4B, the EV charging station bases of FIGS. 5A-5B are of circular or substantially circular (i.e., within typical manufacturing tolerances of circular) cross section. EV charging station bases of circular or substantially circular cross section may be used, for example, to retrofit a pole that also has a circular or substantially circular cross-section.

The materials, material thicknesses, etc., used to produce an exemplary EV charging station base as shown in FIGS. 5A-5B may be the same as or similar to those used to produce an exemplary EV charging station base such as that shown in FIGS. 4A-4B. Exemplary EV charging station bases like those shown in FIGS. 5A-5B may be manufactured by any suitable technique known in the art for forming hollow metallic structures of circular or substantially circular cross section.

Figure 6:
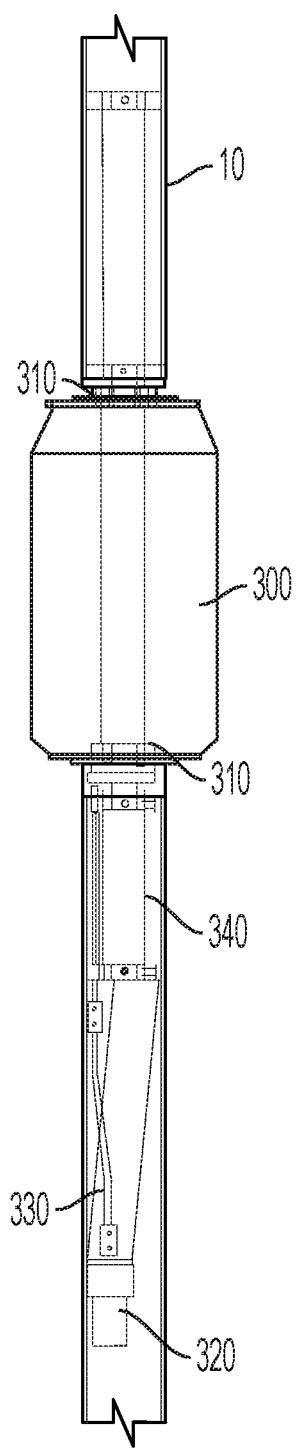
FIG. 6 is an enlarged view of a portion of the retrofit EV charging system of FIG. 2 illustrating a moving advertising sign thereof in more detail.

An enlarged view of the moving display (e.g., sign) assembly that forms a part of the retrofit EV charging system of FIGS. 2-3 is illustrated in FIG. 6. The construction, installation into a pole, and operation of various exemplary moving sign assemblies that may be used in an exemplary retrofit EV charging system is described and shown in U.S. patent application Ser. No. 14/840,990 (US 2016/0240114 A1, now issued U.S. Pat. No. 10,373,531 B2) to Jorma Rauma and Harri Rauma, which is hereby incorporated by reference as if fully recited herein.

Generally speaking, such a moving display is installed to a pole to be retrofit by first separating the pole into two halves at a desired location of the moving display and then reconnecting the separated pole halves in a structurally sound manner by interposing the display assembly therebetween. One or more flange block/bushing assemblies (310) or similar components may be installed into each of the separated halves of the pole to receive a support shaft about which the moving display may rotate relative to the pole, or to which the moving display may be coupled such that both the display and shaft rotate relative to the pole.

An electric gear motor (320) having appropriate speed reduction capabilities, or an electric motor coupled to appropriate speed reduction gearing, may be used to rotate the moving display. The motor may be coupled to a driveshaft (340) through a flexible drive cable (330), with the driveshaft in turn coupled either to one of the flange block assemblies or to the support shaft, depending on whether the support shaft is to rotate with the display or to remain stationary. In any case, energization of the motor will cause the display to rotate about the pole.

The design and construction of an exemplary moving display assembly may be such that the electrical energy required to power the motor is routed thereto from the EV charging station base, which may also include any electrical hardware necessary to support operation of the moving display. Furthermore, the design and construction of an exemplary moving display assembly may permit electrical wiring to pass therethrough (e.g., through a hollow support shaft) so that the electrical/electronic componentry within the EV charging station base may be in electrical communication with an electrical energy-consuming device (e.g., light) or an electrical energy-producing device (e.g., wind turbine, solar panel) located along the light pole at a point above the moving display assembly.

Figure 7:
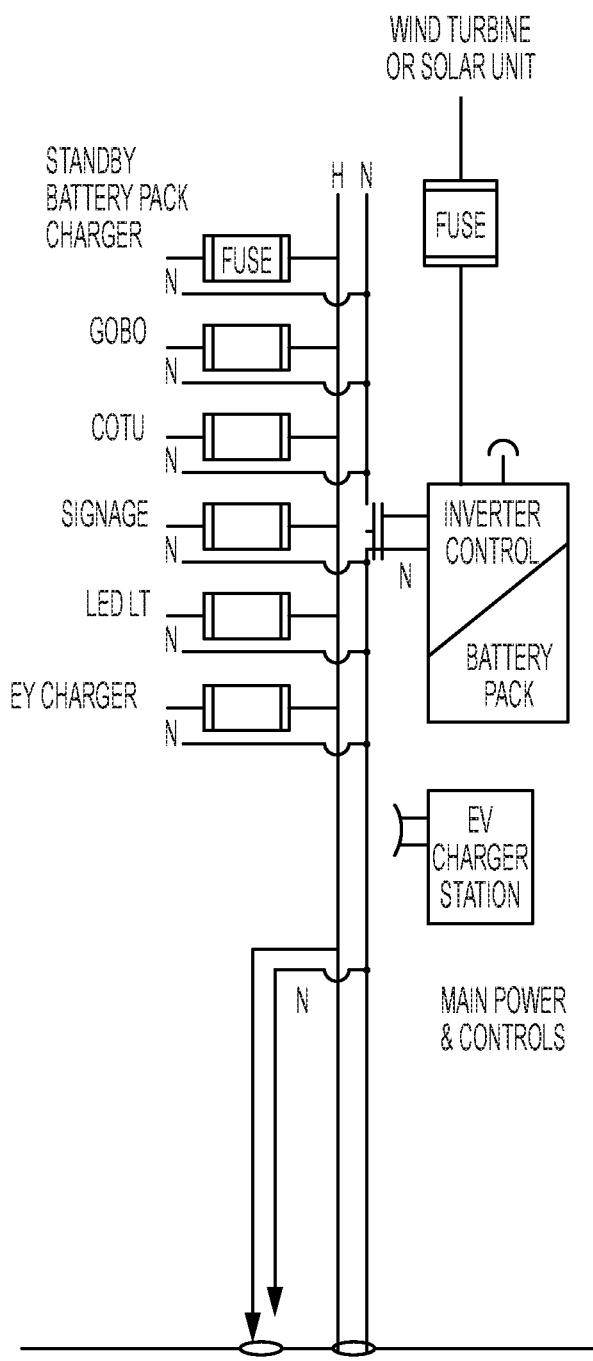
FIG. 7 is a basic wiring diagram for an exemplary retrofit EV charging system, such as the exemplary system of FIG. 2 or FIG. 3.

Referring now to FIG. 7, an exemplary basic wiring diagram for an exemplary retrofit EV charging system may be observed. This particular wiring diagram corresponds to the exemplary retrofit EV charging system of FIG. 3, but the hardware and wiring represented therein may be easily modified for use with an exemplary retrofit EV charging system such as that depicted in FIG. 1, FIG. 2, or otherwise.

As indicated in FIG. 7, electrical energy is supplied via buried wiring that passes through a buried concrete anchor base to which an exemplary custom EV charging station base is installed. The wiring feeds electrical energy to the main power and controls section of the retrofit EV charging system, the components of which are securely housed within the interior of the EV charging station base. Such components may include, for purposes of illustration and not limitation, voltage suppressors, rectifiers, converters, inverters, control and monitoring components, etc.

The main power and controls section of the system subsequently feeds electrical energy to and controls the operation of the individual EV charging stations installed to the EV charging station base, as well as any other electrical energy-consuming devices associated therewith (see examples below). Likewise, electrical energy is also routed to the light of the retrofit light pole, which may, but is not required to be, controlled by the main power and controls section in the EV charging station base.

In addition to the EV charging stations and pole light, the exemplary system embodiment of FIG. 3 also includes a pole-mounted display device and an alternative (supplemental) electrical energy generation device in the form of a wind turbine. Consequently, the wiring diagram depicts protected connections for both items.

The wiring diagram also reflects the inclusion of an inverter and battery pack. As would be understood by one of skill in the art, if the alternative electrical energy generation device produces AC electrical energy (e.g., like a typical wind turbine), then electrical energy from the alternative electrical energy generation device may be fed directly to AC type electrical energy-consuming devices of the system, or may be converted to DC type electrical energy by an AC-DC converter (e.g., rectifier) for storage in the battery pack. Likewise, DC type electrical energy stored in the battery pack may be converted to AC type electrical energy by the inverter and used to supplement the line-side electrical energy provided to the AC type electrical energy-consuming devices of the system. Inverted AC type electrical energy from the battery pack may also be used as a short-term primary energy source for at least some system devices (e.g., Wi-Fi routers/access points, cellular transceivers, etc.) of some exemplary systems during a power outage, etc. In any case, the wiring diagram of FIG. 7 is merely exemplary in nature, and the wring diagram for a given retrofit EV charging system may differ from the exemplary wiring diagram provided herein.

Figure 8:
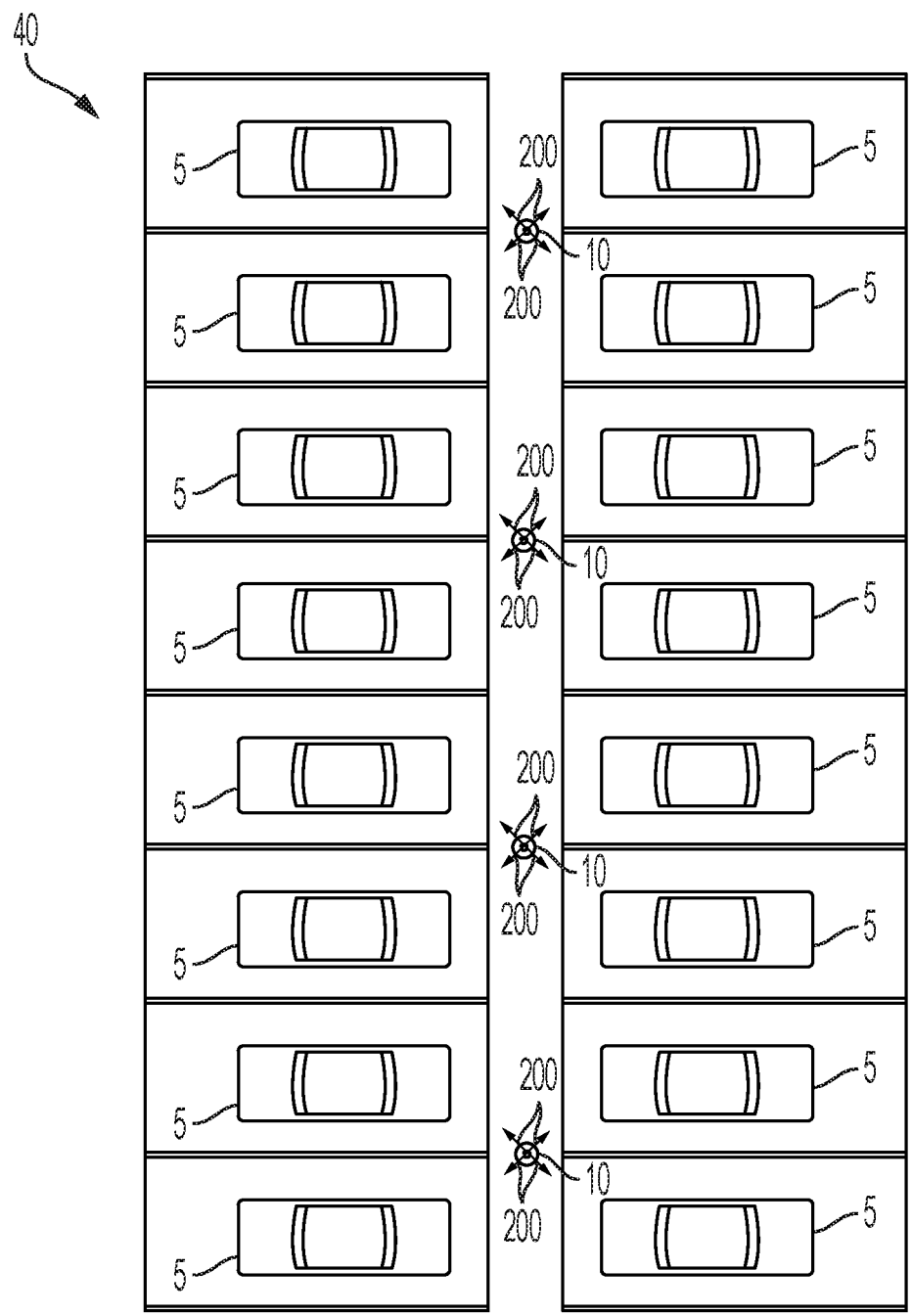
FIG. 8 schematically represents a multitude of electrical vehicles being charged by a series of four exemplary retrofit EV charging systems according to the general inventive concept.

FIG. 8 represents one exemplary retrofit EV charging system installation including multiple retrofit poles, each of which has been retrofitted to an EV charging station base having four individual EV charging stations. In this particular example, there are four retrofit poles and corresponding EV charging station bases providing 16 total EV charging stations in an exemplary vehicle parking lot (40). As can be observed, with proper spacing between the poles and associated EV charging station bases, 16 electric vehicles (5) may be simultaneously and conveniently charged while parked in a normal manner. A multitude of other configurations are certainly also possible.

Retrofit installations according to the general inventive concept will adhere to all applicable codes, can maintain any required master/slave relationship between the existing poles of a multi-pole installation for purposes of photo cell actuation, etc. When a given installation requires alterations or upgrades to an existing electrical panel and its supply to carry an additional load, consultation and permitting with local inspection authorities is typically mandatory. Under certain conditions, carefully controlled installation procedures at standards higher than deemed necessary may be automatically applied to a given installation protocol.

An exemplary retrofit EV charging system may offer more than just the ability to charge an electric vehicle. In fact, an exemplary retrofit EV charging system, or a connected multitude of retrofit EV charging systems, may act as a source of information relative to the location(s) of the EV charging system(s), a source of emergency information (e.g., natural disaster communications, Amber Alerts, etc.), a source of advertising of various types, and/or an Internet connection mechanism such as through Wi-Fi and/or cellular communications. In the case of a retrofit EV charging system having an alternative energy generation device(s) and/or a battery pack, the system may also serve as a communications portal and device charging point for at least some time during routine power outages, natural disasters, etc.

An exemplary EV charging system embodiment may include various features that support the provided electric vehicle charging function. For example, an exemplary system may provide for point-of-sale (POS) payment processing for an EV charging operation. Payment processing may be accomplished in a given exemplary system via any technique known in the art such as, but not limited to, mobile payment techniques utilizing a smart phone or similar device, traditional credit card, debit card or gift card processing, checks, and/or charging system-specific user accounts with protected passwords or one or more forms of biometric authentication.

For purposes of processing EV charging payments and otherwise, an exemplary system embodiment may also be equipped with Internet connectivity. This may generally be accomplished through wireless networking techniques such as Wi-Fi, but a given system may also be provided with wired connectivity via, for example, an ethernet connection and associated cabling that is provided through the existing electrical conduit. An exemplary system embodiment may also be provided with cellular failover in order to process EV charging payments, to provide for other communications, etc., via cellular communication in the event the Wi-Fi connection is down.

In addition to utilizing Internet connectivity for POS/POP purposes, exemplary system and method embodiments may offer pay for use Internet connectivity to EV charging customers and others within range of a given charging station. For example, when a person having a Wi-Fi equipped device such as a smart phone, tablet, laptop computer, etc., enters an area of Wi-Fi connectivity surrounding an exemplary EV charging station, the Wi-Fi enabled device may display a message that identifies the Wi-Fi network and offers secure Internet access based on some presented terms. Such a message/offer may also be presented by a display of the EV charging station at some point during an interaction of an EV charging customer and the system. As in the case of paying for EV charging at the EV charging station, payments for Internet access may be transacted in a similar manner.

It is envisioned that a plurality of exemplary systems may be located in proximity to one another. For example, a number of exemplary EV charging systems may be located in the parking lot of a commercial establishment (store). In such a case, the systems may engage in pole-to-pole communications. Furthermore, individual systems may be equipped with extenders to provide a larger area of Internet connectivity and intercommunication, or may be equipped with appropriate Wi-Fi communication hardware (e.g., routers) to form a mesh network.

Internet connectivity and/or pole-to-pole communications may also be facilitated through, or supplemented through, cellular communication techniques such as by equipping a given retrofit EV charging system or a collection of systems with appropriate cellular transceivers and/or other hardware/software that enables the desired communications. It is further realized that when enough exemplary retrofit EV charging systems within a given geographic area are equipped with appropriate cellular transceivers, repeaters, etc., the so-equipped EV charging systems may form a cellular network or expand an existing cellular network. Such a network may offer the possibility of generating additional revenue by leasing bandwidth on the networked systems to a mobile communications provider.

It is further realized that exemplary retrofit EV charging system embodiments—with or without Internet connectivity—may offer significant audible and visual advertising opportunities. For example, in the case of a system embodiment with Internet connectivity, advertisements may be remotely provided and managed, and said advertisements may pushed to user devices that become connected to the Internet through the system. Alternatively, or in addition thereto, the Internet connection may be used to provide advertisements that are shown/played on a display associated with the transformer base, such as part of the EV charging station. In the case of system embodiments without Internet connectivity, advertisements may also be shown/played on a display associated with the transformer base, but with the content being provided other than through an Internet connection, such as from microprocessor readable memory located within the transformer base.

Other forms of advertising may also be present in exemplary system embodiments, regardless of whether Internet access is present or lacking. For example, it is envisioned that a pole mounted to the transformer base may be provided with various types of static or dynamic displays. That is, a display may be a sign or other device that exhibits a static message or a changing message, and/or a sign or other device that may physically move relative to the pole. Exemplary signage could be an electronic display device, such as an outdoor LCD or LED display, via which one or a multitude of static or changing messages may be displayed. As mentioned above, advertising material for the electronic display device may be transmitted over an Internet connection when present, or may be located in memory associated with the transformer base.

In lieu of or in addition to a LCD or LED type electronic display device, other embodiments may utilize a static or moving display element, such as an illuminated sign. A static sign may be an internally illuminated glass or plastic sign, a neon sign, or any other type of similar signage that would be familiar to one of skill in the art. A moving sign may be of various configuration, including but not limited to, a sign of virtually unlimited shape that rotates about the central axis of the pole.

Regardless of the particular advertising mechanism(s) used, the nature of the advertising may provide any content desired. For example, in the case of one or more exemplary EV charging poles that are located in the parking lot of a retail store, the advertisements may be targeted to products, sales, services, etc., related to that store. As another example, the advertising provided by an exemplary EV charging pole(s) located in the parking lot of a fast food restaurant may relate to food items sold by the restaurant, including advertising for suppliers of products sold by the restaurant (e.g., a revolving Coca-Cola® can on an exemplary pole located in a McDonald's parking lot).

Certain exemplary embodiments of the general inventive concept are described in detail above for purposes of illustration and instruction. It should be understood, however, that modifications to said exemplary embodiments are possible without departing from the general inventive concept. For example, while exemplary EV charging station bases of frusto-pyramidal and round cross-section are shown and described, other cross-sectional shapes may also be possible.

Likewise, an exemplary retrofit EV charging system is not limited to use with a pole of any particular type, profile, height or construction. For example, the cross-sectional shape of the pole to be retrofit may be circular, oval, square, etc.

Further, while exemplary systems are described herein as being for use in retrofitting an existing light or other type of pole, it is to be realized that an exemplary EV charging station base as described and shown herein may also be used in a new installation—i.e., to install an EV charging station and pole where no pole previously existed.

Therefore, while certain embodiments of the general inventive concept are described in detail above, the scope of the general inventive concept is not considered limited by such disclosure, and modifications are possible without departing from the spirit of the general inventive concept as evidenced by the following claims:

What is claimed is:

1. A retrofit electric vehicle (EV) charging system, comprising:
an existing pole to be retrofit;

a custom EV charging station base comprising a secure, substantially hollow enclosure interposed between the pole to be retrofit and an existing buried anchor base to which the pole is initially secured; and at least one EV charging station built into the EV charging station base, the at least one EV charging station configured for protected connection within the EV charging station base to a source of electrical energy and to permit the charging of an electric vehicle from the exterior of the EV charging station base.

2. The retrofit electric vehicle (EV) charging system of claim 1, wherein the EV charging station base has a cross-sectional shape selected from the group consisting of frusto-pyramidal, circular, and substantially circular.

3. The retrofit electric vehicle (EV) charging system of claim 1, wherein the EV charging system comprises an internet connection mechanism.

4. The retrofit electric vehicle (EV) charging system of claim 1, further comprising a point-of-sale (POS) payment processor.

5. The retrofit electric vehicle (EV) charging system of claim 1, wherein the existing pole comprises a moving display element.

6. The retrofit electric vehicle (EV) charging system of claim 1, wherein the EV charging station base comprises at least one display selected from the group consisting of a static display, a dynamic display, an audible display, and combinations thereof.

7. The retrofit electric vehicle (EV) charging system of claim 1, wherein the EV charging station base comprises at least four EV charging stations.

8. The retrofit electric vehicle (EV) charging system of claim 3, wherein the internet connection mechanism is selected from the group consisting of Wi-Fi, ethernet, cellular communications, and combinations thereof.

9. The retrofit electric vehicle (EV) charging system of claim 3, further comprising a point-of-sale (POS) payment processor.

10. The retrofit electric vehicle (EV) charging system of claim 3, wherein the EV charging station base comprises at least one display selected from the group consisting of a static display, a dynamic display, an audible display, and combinations thereof.

11. The retrofit electric vehicle (EV) charging system of claim 4, wherein the point-of-sale (POS) payment processor is selected from the group consisting of a mobile payment processor utilizing a smart phone or similar device, a credit card processor, a check processor, a charging system-specific user account processor, and combinations thereof.

12. The retrofit electric vehicle (EV) charging system of claim 5, wherein the moving display element is a three-dimensional sign.

13. The retrofit electric vehicle (EV) charging system of claim 8, further comprising a point-of-sale (POS) payment processor.

14. The retrofit electric vehicle (EV) charging system of claim 8, wherein the EV charging station base comprises at least one display selected from the group consisting of a static display, a dynamic display, an audible display, and combinations thereof.

15. The retrofit electric vehicle (EV) charging system of claim 9, wherein the point-of-sale (POS) payment processor is selected from the group consisting of a mobile payment processor utilizing a smart phone or similar device, a credit card processor, a check processor, a charging system-specific user account processor, and combinations thereof.

16. The retrofit electric vehicle (EV) charging system of claim 12, wherein the three-dimensional sign is configured to rotate about a central axis of the existing pole.

17. The retrofit electric vehicle (EV) charging system of claim 12, wherein the EV charging station base comprises electrical hardware to provide electrical energy to the moving display element.

18. The retrofit electric vehicle (EV) charging system of claim 13, wherein the point-of-sale (POS) payment processor is selected from the group consisting of a mobile payment processor utilizing a smart phone or similar device, a credit card processor, a check processor, a charging system-specific user account processor, and combinations thereof.

19. The retrofit electric vehicle (EV) charging system of claim 16, wherein the EV charging station base comprises electrical hardware to provide electrical energy to the moving display element.

20. A method of retrofitting an existing pole to add at least one electric vehicle (EV) charging station, comprising:

providing a custom EV charging station base comprising a secure, substantially hollow enclosure, the EV charging station base further comprising at least one EV charging station;

disconnecting the pole to be retrofit from an existing buried anchor base residing subjacent to the pole;

securing a lower end of the EV charging station base to the buried anchor base;

affixing a base of the pole to a top end of the EV charging station base such that the EV charging station base is securely interposed between the pole and the anchor base; and connecting the at least one EV charging station to a source of electrical energy at a point within the EV charging station base; and wherein an electric vehicle may be charged by the at least one EV charging station from outside the EV charging station base.

* * * * *